(12) United States Patent
Mansour et al.

(10) Patent No.: US 8,175,063 B2
(45) Date of Patent: May 8, 2012

(54) SYSTEM AND METHOD FOR CIRCULATING THE ASSIGNMENT OF WALSH CODES AMONG MOBILE UNITS IN CONTROL/HOLD STATES

(75) Inventors: Nagi A. Mansour, Arlington, VA (US); Shane David Chapman, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 1510 days.

(21) Appl. No.: 11/199,638

(22) Filed: Aug. 9, 2005

(65) Prior Publication Data

US 2006/0056374 A1    Mar. 16, 2006

Related U.S. Application Data

(60) Provisional application No. 60/608,910, filed on Sep. 13, 2004.

(51) Int. Cl.
*H04B 7/216* (2006.01)
(52) U.S. Cl. ......... 370/335; 370/342; 370/209; 455/350
(58) Field of Classification Search .................. 370/335, 370/342, 209; 455/450
See application file for complete search history.

(56) References Cited

U.S. PATENT DOCUMENTS

| | | | |
|---|---|---|---|
| 6,208,615 B1 | 3/2001 | Faruque et al. | |
| 6,351,460 B1 * | 2/2002 | Tiedemann et al. | 370/332 |
| 6,725,062 B1 * | 4/2004 | Paranchych | 455/561 |
| 6,912,211 B2 * | 6/2005 | Gerakoulis | 370/329 |
| 7,133,353 B2 * | 11/2006 | Sourour et al. | 370/208 |
| 2003/0095499 A1 * | 5/2003 | Kim et al. | 370/209 |
| 2004/0208176 A1 * | 10/2004 | Goderis et al. | 370/389 |
| 2005/0002529 A1 * | 1/2005 | Vannithamby | 380/255 |
| 2005/0054389 A1 * | 3/2005 | Lee et al. | 455/574 |
| 2005/0124348 A1 * | 6/2005 | Gaal et al. | 455/450 |

OTHER PUBLICATIONS

International Search Report and Written Opinion for PCT/US05/33072 dated Feb. 12, 2008.

* cited by examiner

*Primary Examiner* — Nghi Ly

(57) ABSTRACT

Systems and methods for Walsh code assignment are provided. In accordance with the disclosed exemplary embodiments, when a set of mobile communication units (MU) is in a control/hold state, instead of a base transceiver station (BTS) assigning Walsh codes for respective dedicated control channels (dcch) to the set of mobile communication units (MU) on a one-to-one basis, the base transceiver station (BTS) circulates the Walsh codes among the set of mobile communication units (MU). Thus, at a given time, the base transceiver station (BTS) has assigned the available Walsh codes to only a subset of the mobile communication units (MU) in the control/hold state. Accordingly, this Walsh code assignment allows the system to support more mobile communication units (MU) in the control/hold state.

19 Claims, 5 Drawing Sheets

FIG. 1A
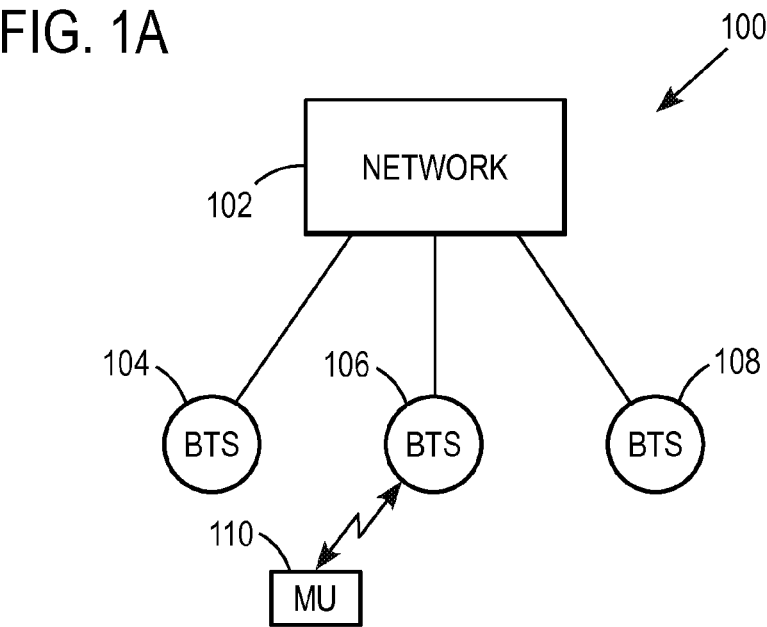
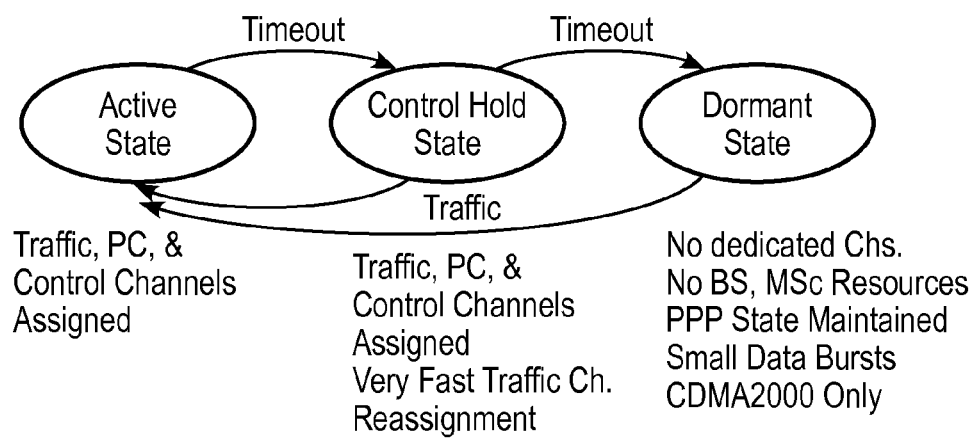
FIG. 1B

FIG. 2A
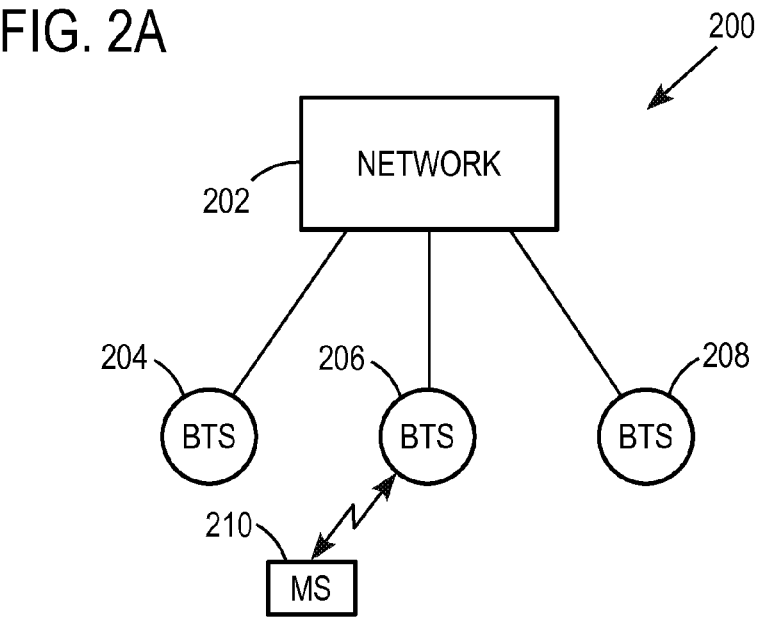
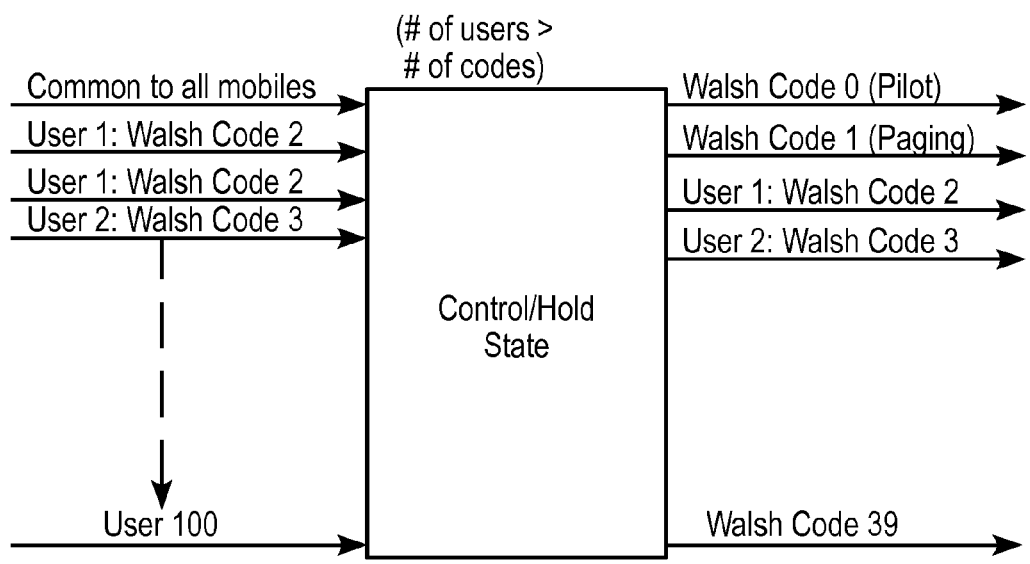
FIG. 2B

US 8,175,063 B2

SYSTEM AND METHOD FOR CIRCULATING THE ASSIGNMENT OF WALSH CODES AMONG MOBILE UNITS IN CONTROL/HOLD STATES

CROSS-REFERENCE TO A RELATED APPLICATION

This application claims the benefit of the filing date of Provisional Application, Ser. No. 60/608,910, filed on Sep. 13, 2004, and entitled "System and Method for Walsh Code Assignment," which is herein incorporated by reference.

FIELD OF THE INVENTION

This invention relates generally to wireless communication systems, and in particular, to a system and method for circulating the assignment of Walsh codes among mobile communication units (MU) in control/hold states.

BACKGROUND OF THE INVENTION

Conventional wireless communication systems typically include a network consisting of a plurality of network devices, and a plurality of base transceiver stations (BTS) to allow the network to communicate with a plurality of mobile communication units (MU) by way of a wireless medium. Typically, in such conventional wireless communication systems, a mobile communication unit (MU) may be communicating with a base transceiver station (BTS) in various media access control (MAC) states. In CDMA2000-based wireless communication systems, for example, such MAC states include dormant, active, and control/hold state. These states are explained in more detail below with reference to the following example.

FIG. 1A illustrates a block diagram of an exemplary conventional wireless communication system 100. The conventional wireless communication system 100 consists of a network 102 and a plurality of base transceiver stations (BTS) 104, 106, and 108 coupled to the network 102. The base transceiver stations (BTS) 104, 106, and 108 are assigned to communicate with a plurality of mobile communication units (MU), one of which is shown in this example as mobile communication unit 110 assigned to communicate with base transceiver station (BTS) 106. It shall be understood that base transceiver station (BTS) 106 may communicate with other mobile communication units (MU) (not shown) in addition to mobile communication unit (MU 110). Also, the other base transceiver stations (BTS) 104 and 108 may communicate with other mobile communication units (MU) (not shown).

FIG. 1B illustrates a diagram of various media access control (MAC) states in which the mobile communication unit (MU) 110 communicates with the base transceiver station (BTS) 106 in the conventional wireless communication system 100. As discussed above, the three MAC states are the dormant, active, and control/hold. In the dormant state, the mobile communication unit (MU) 110 maintains only common channels with the base transceiver station (BTS). The common channels are used by all the mobile communication units (MU) assigned to communicate with the base transceiver station (BTS). In the dormant state, the mobile communication unit (MU) 110 does not have a dedicated channel to communicate with the base transceiver station (BTS) 106. The mobile communication unit (MU) 110 uses the common channels to obtain one or more dedicated channels for transmitting and receiving data to and from the base transceiver station (BTS) 106.

When the mobile communication unit (MU) 110 has received an assignment of a dedicated channel and begins to send and/or receive data to and from the base transceiver station (BTS) 106, the mobile communication unit (MU) 110 is in the active state. In the active state, the mobile communication unit (MU) 110 has a dedicated control channel (DCCH) if the data rate is 9.6 kbps plus a dedicated traffic channel (i.e., the supplemental channel (SCH)) for higher data rates to communicate with the base transceiver station (BTS) 106. More specifically, the mobile communication unit (MU) 110 communicates control and power messages as well as data (e.g., voice and/or non-speech data) by way of the dedicated control channel (DCCH). If the data rate between the mobile communication unit (MU) 110 and the base transceiver station (BTS) 106 is above 9.6 kbps, then the mobile communication unit (MU) 110 also uses the supplemental channel (SCH) to transmit and receive data to and from the base transceiver station (BTS) 106. The mobile communication unit (MU) 110 remains in the active state as long as data is being transmitted; or if it has ceased, until a predetermined time period thereafter.

If the predetermined time period of no data transmission has expired while the mobile communication unit (MU) 110 is in the active state, the mobile communication unit (MU) 110 enters the control/hold state. In the control/hold state, the mobile communication unit (MU) 110 has a dedicated channel (e.g., a dedicated control channel (DCCH) or a fundamental channel (FCH)) with the base transceiver station (BTS) 106, but not a supplemental channel (SCH). As discussed above, the mobile communication unit (MU) 110 communicates control and other signaling messages as well as data to the base station transceiver (BTS) 106 by way of the dedicated channel. The mobile communication unit (MU) 110 returns to the dormant state from the control/hold state if it is does not send or receive data in the control/hold state for a predetermined time period.

FIG. 1C illustrates a diagram of a conventional Walsh code assignment scheme for mobile communication units (MU) in the control/hold MAC state. While in the control/hold state, the base transceiver station (BTS) 106 assigns a Walsh code to the mobile communication unit (MU) 110 for use as a dedicated channel. In fact, when there are a plurality of mobile communication units (MU) in the control/hold state, the base transceiver station (BTS) 106 assigns one Walsh code per each mobile communication unit (MU). In CDMA2000, the base transceiver station (BTS) 106 uses 64 Walsh codes to communicate with its assigned mobile communication units (MU). Some of those Walsh codes are reserved for common channel applications, such as for the pilot, paging, and synchronization channels. Thus, there may be, for example, only 39 remaining Walsh codes for use by respective mobile communication units (MU) in the control/hold state for respective dedicated channels. Accordingly, the number of mobile communication units (MU) that can be supported in the control/hold state is limited to a relatively low number (e.g., 39).

SUMMARY OF THE INVENTION

An aspect of the invention relates to a wireless communication system, comprising a network and a plurality of base transceiver stations (BTS) coupled to the network. At least one of the base transceiver station (BTS) is adapted to reassign Walsh codes on a time basis among a plurality of mobile communication units (MU) in a control/hold media access control (MAC) state. Thus, at any given time, the Walsh codes are assigned to only a subset of the mobile communication units (MU) in the control/hold state. The Walsh codes may be assigned to the mobile communication units (MU) in a circular fashion or in other manners. The Walsh codes are used for respective dedicated channels between the base transceiver station (BTS) and the current subset of the mobile communication units (MU). The dedicated channels are used to transfer information between the base transceiver station (BTS) and mobile communication units (MU). Such information may include a request for a supplemental channel for transmission of data above 9.6 kbps.

In the case of when a base transceiver station receives a request to send data to a particular mobile communication unit (MU) in the control/hold state when it does not have a Walsh code, the base transceiver station (BTS) may queue the data transmission request for that particular mobile communication unit (MU) until it receives a reassignment of a Walsh code for a dedicated channel. At such time, the base transceiver station (BTS) may transmit data to the mobile communication unit (MU) pursuant to the data transmission request using the dedicated channel. The base transceiver station (BTS) may have received the data transmission request from a network device, such as a mobile switching center (MSC), dispatch call controller, base station controller, or other network device.

Another aspect of the invention relates to a base transceiver station (BTS), comprising an antenna; a radio frequency (RF) interface; and a processor adapted to reassign Walsh codes on a time basis among a plurality of mobile communication units (MU) in a control/hold media access control (MAC) state. The Walsh codes may be assigned to the mobile communication units (MU) in a circular fashion or in other manners. The processor may perform such circulation of Walsh codes by continuously or repetitively invalidating an assignment of a Walsh code to a particular mobile communication unit (MU) (e.g., by sending a Walsh code invalid notification to the "donor" mobile communication unit (MU)), and reassigning the Walsh code to the another mobile communication unit (e.g., by sending an assignment of Walsh code notification to "receiver" mobile communication unit (MU)). The processor is adapted to establish respective dedicated channels to the mobile communication units (MU) using the Walsh codes. Using the dedicated channels, the processor may send and/or receive data to and/or from the respective mobile communication units (MU).

In the case of when the processor receives a request to send data to a particular mobile communication unit (MU) in the control/hold state when it does not have a Walsh code, the base transceiver station (BTS) may queue the request until that particular mobile communication unit (MU) receives an assignment of a Walsh code for a dedicated channel. At such time, the base transceiver station (BTS) may send data pursuant to the request to the mobile communication unit (MU) using the dedicated channel. The base transceiver station (BTS) may have received the data transmission request from a network device, such as a mobile switching center (MCS), dispatch call controller, base station controller, etc.

Yet another aspect of the invention relates to a mobile communication unit (MU), comprising an antenna; a radio frequency (RF) interface; and a processor adapted to receive on a time basis an assignment of a first Walsh code for a first dedicated channel from a base transceiver station (BTS) by way of the antenna and RF interface; a notification indicating that the first Walsh code for the dedicated channel is invalid from the base transceiver station (BTS) by way of the antenna and RF interface; and an assignment of a second Walsh code for a second dedicated channel from the base transceiver station (BTS) by way of the antenna and RF interface.

The processor may be further adapted to receive a request to send data to a base transceiver station (BTS) or to a network device via the base transceiver station (BTS) from the user via an input device. In the case the processor receives the data transmission request while it does not have a valid Walsh code for a dedicated channel, the processor may queue the request until it receives a new assignment of a Walsh code for the dedicated channel. Once it does, the processor may send the data to the base transceiver station (BTS) using the dedicated channel.

Other aspects, features, and techniques of the invention will be apparent to one skilled in the relevant art in view of the following detailed description of the exemplary embodiments of the invention.

BRIEF DESCRIPTION OF THE DRAWINGS

FIG. 1A illustrates a block diagram of an exemplary conventional wireless communication system;

FIG. 1B illustrates a diagram of various media access control (MAC) states in which the mobile communication unit (MU) uses to communicate with the base transceiver station (BTS) in the conventional wireless communication system;

FIG. 2A illustrates a block diagram of an exemplary wireless communication system in accordance with an embodiment of the invention;

FIG. 2B illustrates a diagram of exemplary Walsh code assignment scheme for mobile communication units (MU) in the control/hold MAC state in accordance with another embodiment of the invention;

DETAILED DESCRIPTION OF THE PREFERRED EMBODIMENTS

Figure 1C:
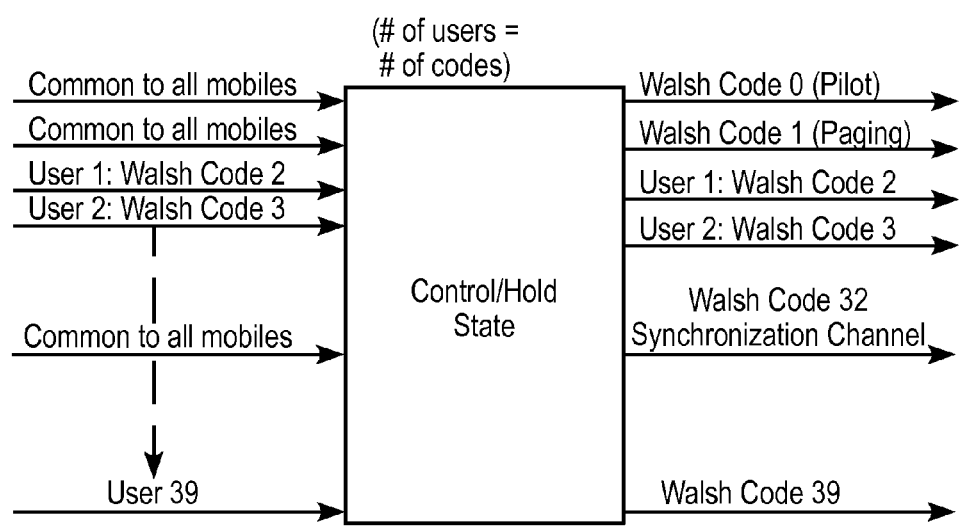
FIG. 1C illustrates a diagram of a conventional Walsh code assignment scheme for mobile communication units (MU) in the control/hold MAC state.

FIG. 2A illustrates a block diagram of an exemplary wireless communication system 200 in accordance with an embodiment of the invention. The wireless communication system 200 comprises a network 202 and a plurality of base transceiver stations (BTS) 204, 206, and 208 coupled to the network 202. The base transceiver stations (BTS) 204, 206, and 208 are assigned to communicate with a plurality of mobile communication units (MU), one of which is shown in this example as mobile communication unit 210 assigned to communicate with base transceiver station (BTS) 206. It shall be understood that base transceiver station (BTS) 206 may communicate with other mobile communication units (MU) (not shown) in addition to mobile communication unit (MU) 210. Also, the other base transceiver stations (BTS) 204 and 208 may communicate with other mobile communication units (MU) (not shown).

As discussed in more detail in the Background section, there are three media access control (MAC) states in which the mobile communication unit (MU) 110 communicates with the base transceiver station (BTS) 206. These are the dormant, active, and control/hold states. In the dormant state, the mobile communication unit (MU) 210 uses only a common channel to communicate with the base transceiver station (BTS) 206. In the active state, the mobile communication unit (MU) 210 uses one or more dedicated channels to communicate with the base transceiver station (BTS) 206. In the control/hold state, the mobile communication unit (MU) 202 uses a dedicated channel to communicate with the base transceiver station (BTS) 206.

In the prior art wireless communication system 100, the base transceiver station (BTS) 106 assigns a Walsh code to each mobile communication unit (MU) in the control/hold state. Since there is a limited and relatively small number of available Walsh codes for dedicated channels (e.g., 39), the base transceiver station (BTS) 106 can only support a relatively small number of mobile communication units (MU) in the control/hold state. It would be desirable for a base transceiver station (BTS) to support more mobile communication units (MU) in the control/hold state. This is achieved by the new wireless communication system 200 as discussed below.

FIG. 2B illustrates a diagram of exemplary Walsh code assignment scheme for mobile communication units (MU) in the control/hold MAC state in accordance with another embodiment of the invention. According to the Walsh code assignment scheme, the set of Walsh codes available for the dedicated channels are reassigned on a time basis among the mobile communication units (MU). For example, at a particular time T1, Walsh codes available for the dedicated control channels are assigned to a first subset of the mobile communication units (MU) in the control/hold state. At a later time T2, Walsh codes available for the dedicated control channels are assigned to a second and different subset of the mobile communication units (MU) in the control/hold state. Similarly, at yet another later time T3, Walsh codes available for the dedicated control channels may be assigned to a third and different subset of the mobile communication units (MU) in the control/hold state. The assignment of the Walsh codes to the mobile communication units (MU) may be performed in a circular fashion or in other manners. The technique of continuously reassigning Walsh codes from mobile communication unit (MU) to mobile communication unit (MU) on a time basis may be characterized as Walsh code hopping.

By having the base transceiver station (BTS) 206 continuously reassign Walsh codes on a time basis among the mobile communication units (MU) in the control/hold state, the base transceiver station (BTS) can support a greater number of mobile communication units (MU) in the control/hold state. For example, in the conventional wireless communication system 100 wherein the base transceiver station permanently assigns a Walsh code for each mobile communication unit (MU) in the control/hold state, the conventional base transceiver station (BTS) 106 is able to support about 39 mobile communication units (MU) in the control/hold state. Whereas, in the new wireless communication system 200 wherein the base transceiver station 206 continuously reassigns Walsh codes among the mobile communication units (MU) in the control/hold state, the base transceiver station (BTS) 206 is able to support more mobile communication units (MU) than there are Walsh codes available for dedicated channels (e.g., 100). This improves the efficiency of the reassignment of dedicated channels to mobile communication units (MU) in the control/hold state.

Figure 3A:
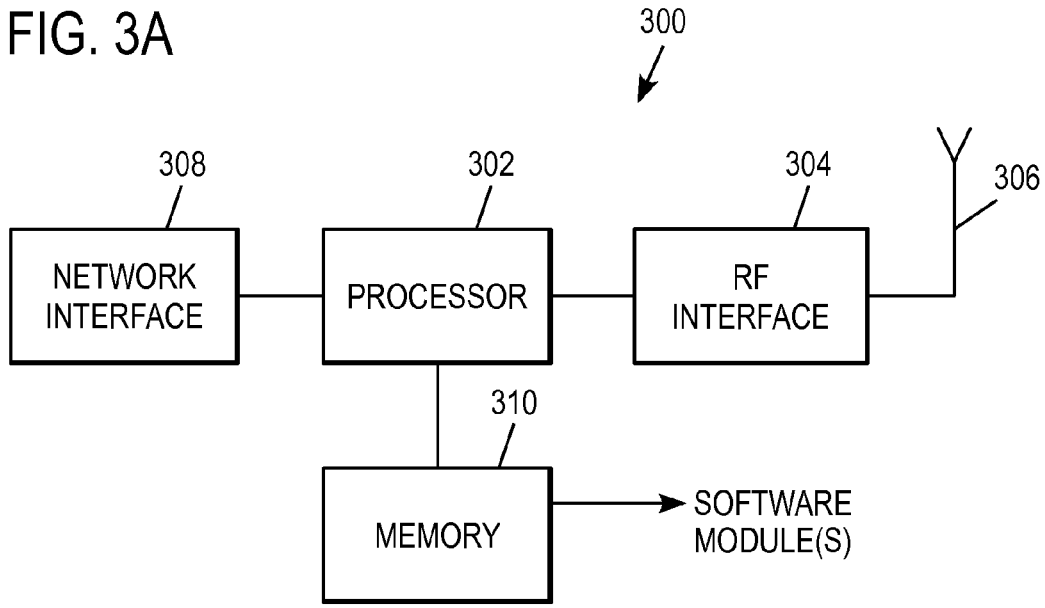
FIG. 3A illustrates a block diagram of an exemplary base transceiver station (BTS) in accordance with another embodiment of the invention.

FIG. 3A illustrates a block diagram of an exemplary base transceiver station (BTS) 300 in accordance with another embodiment of the invention. The base transceiver station (BTS) 300 may be an exemplary detailed version of any one of the base transceiver stations (BTS) 204, 206, and 208 of the wireless communication system 200. In particular, the base transceiver station (BTS) 300 comprises a processor 302, an RF interface 304 and antenna 306, a network interface 308, and a memory 310. The processor 302 assists in performing the various operations of the base transceiver station (BTS) 300, one of which is described with reference to FIG. 3B. The RF interface 306 and antenna 308 provide the processor 302 an interface to the wireless medium for communicating with mobile communication units (MU). The network interface 308 provides the processor 302 an interface to communicate with network devices. And the memory 310, serving generally as a computer readable medium, stores one or more software module(s) for controlling the operations of the processor 302.

Figure 3B:
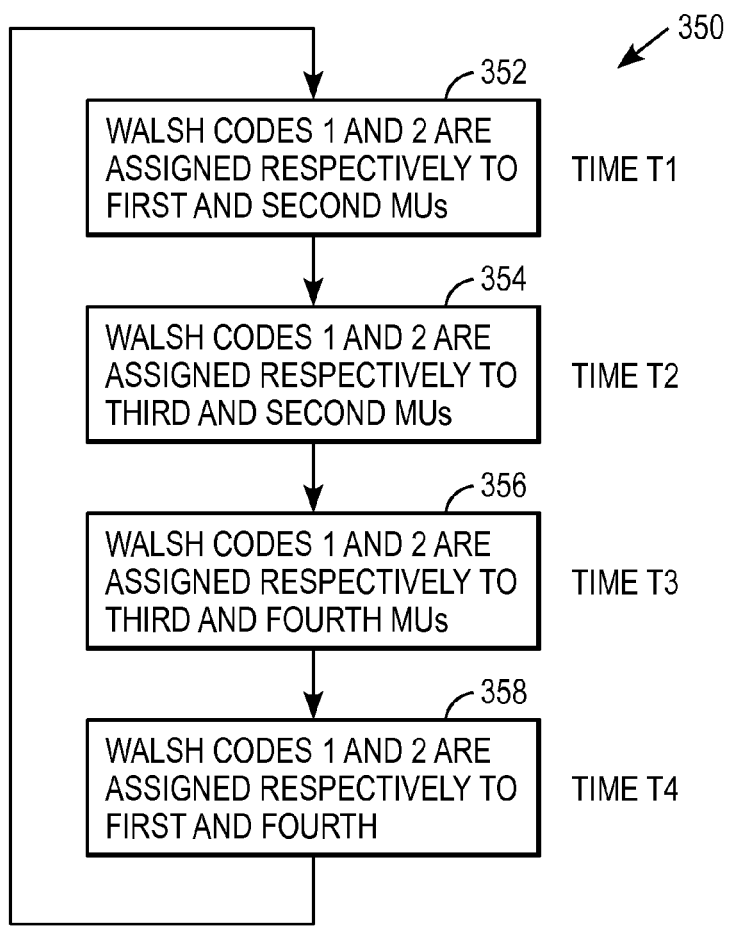
FIG. 3B illustrates a flow diagram of an exemplary method of assigning Walsh codes in accordance with another embodiment of the invention.

FIG. 3B illustrates a flow diagram of an exemplary method 350 of assigning Walsh codes by the exemplary base transceiver station (BTS) 300 in accordance with another embodiment of the invention. For simplicity reasons, it is assumed that base transceiver station (BTS) 300 has only two Walsh codes (Walsh codes 1 and 2) available for assigning to mobile communication units (MU) in the control/hold state, and that there are only four mobile communication units (MU) (first, second, third, and fourth) currently in the control/hold state. It shall be understood that most likely the base transceiver station (BTS) 300 has many Walsh codes (e.g., 39) available to assign to mobile communication units (MU), and that the base transceiver station (BTS) is currently supporting many more mobile communication units (MU) in the control/hold state.

According to the method 350, at a particular time T1, the base transceiver station (300) may have assigned Walsh codes 1 and 2 respectively to the first and second mobile communications units (MU) (a first subset of all the mobile communication units (MU) in the control/hold state) (block 352). The processor 302 may have previously sent the assignments to the first and second mobile communication units (MU) by way of the RF interface 304 and antenna 306. At a later time T2, the base transceiver station (BTS) 300 may have assigned Walsh codes 1 and 2 respectively to the third and second mobile communication units (MU) (a second subset of all the mobile communication units (MU) in the control/hold state) (block 354). To get from block 352 to block 354, the processor 302 may have sent a notification to the first mobile communication unit (MU) indicating that Walsh code 1 is now invalid, and sent a new assignment of Walsh code 1 to the third mobile communication unit (MU).

If at such time T2 (when the first mobile communication unit (MU) does not have a Walsh code for the dedicated control channel (dcch)), the processor 302 receives a request to send data to the first mobile communication unit (MU) from a network device, the processor 302 may queue the request until the Walsh code assignment circulates back to the first mobile communication unit (MU).

At a later time T3, the base transceiver station (BTS) 300 may have assigned Walsh codes 1 and 2 respectively to the third and fourth mobile communication units (MU) (a third subset of all the mobile communication units (MU) in the control/hold state) (block 356). To get from block 354 to block 356, the processor 302 may have sent a notification to the second mobile communication unit (MU) indicating that Walsh code 2 is now invalid, and sent a new assignment of Walsh code 2 to the fourth mobile communication unit (MU). Yet, at a later time T4, the base transceiver station (BTS) 300 may have assigned Walsh codes 1 and 2 respectively to the first and fourth mobile communication units (MU) (a fourth subset of all the mobile communication units (MU) in the control/hold state) (block 358). To get from block 356 to block 358, the processor 302 may have sent a notification to the third mobile communication unit (MU) indicating that Walsh code 1 is now invalid, and sent a new assignment of Walsh code 1 to the first mobile communication unit (MU).

At time T4 (when the first mobile communication unit (MU) has reacquired a Walsh code for the dedicated channel), the processor 302 may now send the data to the first mobile communication unit (MU) using the dedicated channel, pursuant to the request received at time T2.

After block 358, the circulating of the Walsh codes may proceed again with the assignment of Walsh codes 1 and 2 respectively to the first and second mobile communication units (MU). Thus, at a given time, only a subset of the mobile communication units (MU) in the control/hold state have Walsh codes for the dedicated control channels, and the remaining subset do not have Walsh codes. In this example, it was assumed that none of the mobile communication units (MU) (i.e., the first, second, third, and fourth) have left the control/hold state, and that no new mobile communication units (MU) have entered the control/hold state. It shall be understood that the circulating of the Walsh codes accommodates the egress of mobile communication units (MU) from the control/hold state and the ingress of mobile communication units (MU) into the control/hold state.

Further, in this example, the reassignment of the Walsh codes was performed in a circular fashion. That it, the Walsh codes are passed to the mobile communication units (MU) in a circular manner. It shall be understood that the assignment of Walsh codes may be performed in a different manner, such as in a random manner or some other time-based manner.

Figure 4A:
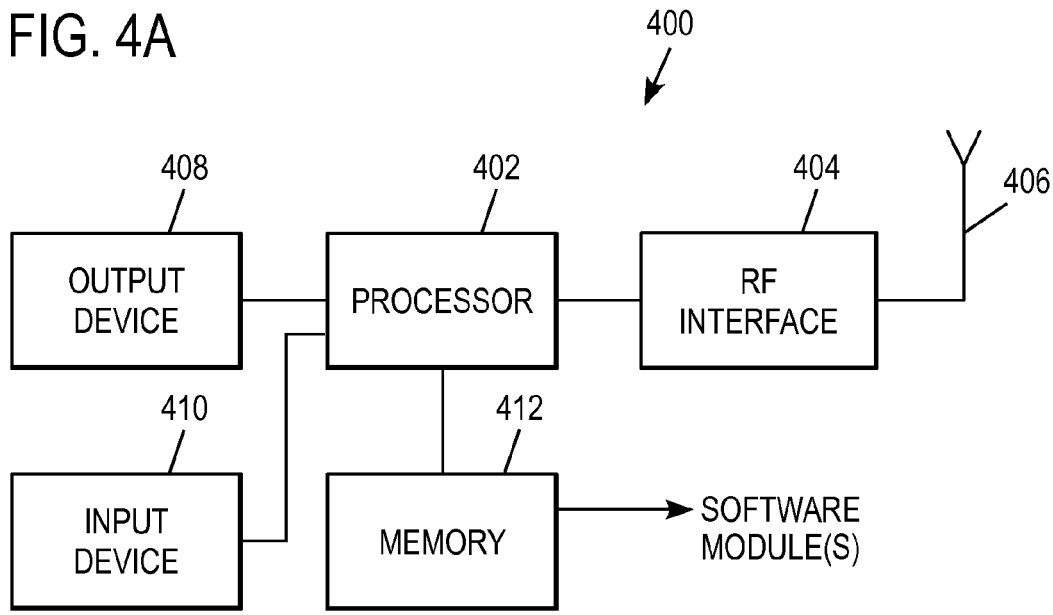
FIG. 4A illustrates a block diagram of an exemplary mobile communication unit (MU) in accordance with another embodiment of the invention.

FIG. 4A illustrates a block diagram of an exemplary mobile communication unit (MU) 400 in accordance with another embodiment of the invention. The mobile communication unit (MU) 400 may be an exemplary detailed version of the mobile communication unit (MU) 210 of the wireless communication system 200. In particular, the mobile communication unit (MU) 400 comprises a processor 402, an RF interface 404 and antenna 406, an output device 408, an input device 410, and a memory 412. The processor 402 assists in performing the various operations of the mobile communication unit (MU) 400, one of which is described with reference to FIG. 4B. The RF interface 404 and antenna 406 provide the processor 402 an interface to the wireless medium for communicating with base transceiver stations (BTS). The output device 408 (e.g., a display, speaker, vibrating unit) allows the processor 402 to send information to a user of the exemplary mobile communication unit (MU) 400. The input device 410 (e.g., keyboard, touch sensitive display, pointing device, microphone) allow a user to send information to the processor 402. And the memory 412, serving generally as a computer readable medium, stores one or more software module(s) for controlling the operations of the processor 402.

Figure 4B:
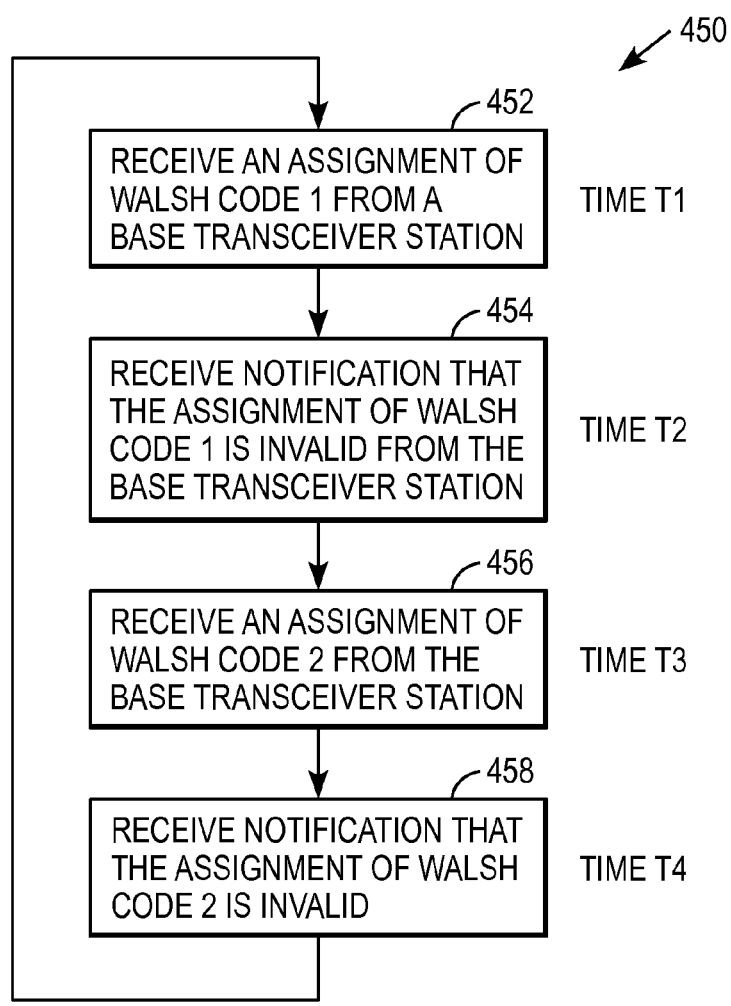
FIG. 4B illustrates a block diagram of an exemplary method of receiving assignments of Walsh codes in accordance with another embodiment of the invention.

FIG. 4B illustrates a block diagram of an exemplary method 450 of receiving assignments of Walsh codes in accordance with another embodiment of the invention. For simplicity reasons, it is assumed that the assigned base transceiver station (BTS) has only two Walsh codes (Walsh codes 1 and 2) available for assigning to mobile communication units (MU) in the control/hold state, and that there are only four mobile communication units (MU) including mobile communication unit (MU) 400. As discussed above, it shall be understood that most likely the base transceiver station (BTS) 300 has many Walsh codes (e.g., 39) available to assign to mobile communication units (MU), and that the base transceiver station (BTS) may be currently supporting many more mobile communication units (MU) in the control/hold state (e.g., 100).

According to the method 450, at a particular time T1, the processor 402 receives an assignment of Walsh code 1 from the assigned base transceiver station by way of the antenna 406 and RF interface 404 (block 452). This may be the case that the mobile communication unit (MU) was previously in the active state, and has now entered the control/hold state. At a later time T2, the processor 402 receives a notification indicating that Walsh code 1 is invalid from the assigned base transceiver station by way of the antenna 406 and RF interface 404 (block 454). This may be the result of the Walsh code assignment circulating method where now the mobile communication unit (MU) 400 temporarily loses the assignment of Walsh code 1 because it is now assigned to another mobile communication unit (MU).

If at such time T2 (when the mobile communication unit (MU) 400 does not have a Walsh code for a dedicated channel to the base transceiver station (BTS)), the processor 402 receives a request to send data to the base transceiver station (BTS) from, for example, the user via the input device 410, the processor 402 may queue the request until it receives a new assignment of a Walsh code.

Then, at a later time T3, the processor 402 receives an assignment of Walsh code 2 from the assigned base transceiver station (BTS) by way of the antenna 406 and RF interface 404 (block 456). This may be the case where the Walsh code assignment has circulated back to the mobile communication unit (MU) 400. The new Walsh code, however, may not be the same Walsh code previously assigned to the mobile communication unit (MU). At such time T3, the processor 402 may send the data pursuant to the data transmission request to the base transceiver station (BTS) using the dedicated channel. If the data rate is more than 9.6 kpbs, for example, the processor 402 may send a request for a supplemental channel via the dedicated channel. The processor 402 then uses both the dedicated channel and the supplemental channel to send the data to the base transceiver station (BTS).

Then, at a later time T4, the processor 402 receives a notification indicating that Walsh code 2 is invalid from the assigned base transceiver station by way of the antenna 406 and RF interface 404 (block 458). This may be the result of the Walsh code assignment circulating method where now the mobile communication unit (MU) 400 temporarily loses the assignment of Walsh code 2 because it is now assigned to another mobile communication unit (MU). This method 450 may be repeated while the mobile communication unit (MU) remains in the control/hold state, and ceases when it leaves this state.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A wireless communication system, comprising: a network; and a plurality of base transceiver stations (BTS) coupled to said network, wherein at least one of said base transceiver station (BTS) is adapted to reassign Walsh codes on a time basis among a plurality of mobile communication units (MU) in a control/hold media access control (MAC) state by assigning a set of Walsh codes to a first subset of the plurality of mobile communication units (MU) during a first period of time and assigning the set of Walsh codes to a second subset of the plurality of mobile communication units (MU) during a second period of time, and by notifying mobile communication units (MU) that are in the first subset but not the second subset that an assigned Walsh code is inactive during the second period of time and notifying mobile communication units (MU) that are in the second subset but not in the first subset that a particular Walsh code of the set of Walsh codes is assigned, wherein the mobile communication units (MU) comprising the first and second subsets is not identical.

2. The wireless communication system of claim 1, wherein said at least one of said base transceiver station (BTS) is adapted to reassign Walsh codes among said mobile communication units (MU) in a substantially circular manner.

3. The wireless communication system of claim 1, wherein said Walsh codes are used only by a subset of said plurality of mobile communication units at a particular time for respective dedicated channels.

4. The wireless communication system of claim 3, wherein at least one of said subset of said plurality of mobile communication units uses a corresponding dedicated channel to communicate with said at least one of said base transceiver station (BTS) in order to obtain a supplemental channel.

5. The wireless communication system of claim 1, wherein said at least one base transceiver station (BTS) is adapted to: receive a request to send data to one of said plurality of mobile communication units (MU) at a particular time when said one of said plurality of mobile communication units (MU) does not have a valid Walsh code; queue the request until said one of said plurality of mobile communication units (MU) has a valid Walsh code for a corresponding dedicated channel; and send data pursuant to said request to said one of said plurality of mobile communication units (MU) using said dedicated channel.

6. The wireless communication system of claim 5, wherein said at least one base transceiver station (BTS) is adapted to receive said request to send data from said network.

7. The wireless communication system of claim 1, wherein there are more mobile communication units in the control/hold MAC state than there are available Walsh codes.

8. A base transceiver station (BTS), comprising: an antenna; a radio frequency (RF) interface; and a processor adapted to reassign Walsh codes on a time basis among a plurality of mobile communication units (MU) in a control/hold media access control (MAC) state by assigning a set of Walsh codes to a first subset of the plurality of mobile communication units (MU) during a first period of time and assigning the set of Walsh codes to a second subset of the plurality of mobile communication units (MU) during a second period of time, and by notifying mobile communication units (MU) that are in the first subset but not the second subset that an assigned Walsh code is inactive during the second period of time and notifying mobile communication units (MU) that are in the second subset but not in the first subset that a particular Walsh code of the set of Walsh codes is assigned, wherein the mobile communication units (MU) comprising the first and second subsets is not identical.

9. The base transceiver station of claim 8, wherein said processor is adapted to reassign Walsh codes among said mobile communication units (MU) in a substantially circular manner.

10. The base transceiver station (BTS) of claim 8, wherein said processor is adapted to establish dedicated channels using said Walsh codes with a subset of said plurality of mobile communication units (MU), respectively.

11. The base transceiver station (BTS) of claim 8, further comprising a network interface, and wherein said processor is adapted to: receive a request to send data to one of said plurality of mobile communication units (MU) by way of said network interface at a particular time when said one of said plurality of mobile communication units (MU) does not have a valid Walsh code; queue the request until said one of said plurality of mobile communication units (MU) has a valid Walsh code for a corresponding dedicated channel; and send data pursuant to said request to said one of said plurality of mobile communication unit (MU) using said dedicated channel.

12. The base transceiver station (BTS) of claim 8, wherein there are more mobile communication units in the control/hold MAC state than there are available Walsh codes.

13. A wireless communication system, comprising: a network; and
a plurality of base transceiver stations (BTS) coupled to said network, wherein at least one of said base transceiver station (BTS) is adapted to provide Walsh code hopping among a plurality of mobile communication units (MU) in a control/hold media access control (MAC) state by assigning a set of Walsh codes to a first subset of the plurality of mobile communication units (MU) during a first period of time and assigning the set of Walsh codes to a second subset of the plurality of mobile communication units (MU) during a second period of time, and by notifying mobile communication units (MU) that are in the first subset but not the second subset that an assigned Walsh code is inactive during the second period of time and notifying mobile communication units (MU) that are in the second subset but not in the first subset that a particular Walsh code of the set of Walsh codes is assigned, wherein the mobile communication units (MU) comprising the first and second subsets is not identical.

14. A method comprising:
reassigning Walsh codes on a time basis among a plurality of mobile communication units (MU) in a control/hold media access control (MAC) state by
assigning a set of Walsh codes to a first subset of the plurality of mobile communication units (MU) during a first period of time and assigning the set of Walsh codes to a second subset of the plurality of mobile communication units (MU) during a second period of time; and
notifying mobile communication units (MU) that are in the first subset but not the second subset that an assigned Walsh code is inactive during the second period of time and notifying mobile communication units (MU) that are in the second subset but not in the first subset that a particular Walsh code of the set of Walsh codes is assigned, wherein the mobile communication units (MU) comprising the first and second subsets is not identical.

15. The method of claim 14, wherein the Walsh codes are reassigned among said mobile communication units (MU) in a substantially circular manner.

16. The method of claim 14, wherein said Walsh codes are used only by a subset of said plurality of mobile communication units at a particular time for respective dedicated channels.

17. The method of claim 14, wherein at least one of said subset of said plurality of mobile communication units uses a corresponding dedicated channel to communicate with said at least one of said base transceiver station (BTS) in order to obtain a supplemental channel.

18. The method of claim 14, wherein said at least one base transceiver station (BTS)
    receives a request to send data to one of said plurality of mobile communication units (MU) at a particular time when said one of said plurality of mobile communication units (MU) does not have a valid Walsh code;
    queues the request until said one of said plurality of mobile communication units (MU) has a valid Walsh code for a corresponding dedicated channel; and
    sends data pursuant to said request to said one of said plurality of mobile communication units (MU) using said dedicated channel.

19. The method of claim 18, wherein said at least one base transceiver station (BTS) receives said request to send data from said network.

* * * * *